(12) United States Patent
Chen et al.

(10) Patent No.: US 7,402,989 B2
(45) Date of Patent: Jul. 22, 2008

(54) CAPACITOR MULTIPLIER

(75) Inventors: Ke-Horng Chen, Taipei County (TW); Li-Ren Huang, Taipei County (TW); Chia-Wrong Chang, Taoyuan County (TW); Le-Shian Liu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 259 days.

(21) Appl. No.: 11/308,679

(22) Filed: Apr. 21, 2006

(65) Prior Publication Data

US 2007/0165430 A1    Jul. 19, 2007

(30) Foreign Application Priority Data

Jan. 19, 2006    (TW) .............................. 95102041 A

(51) Int. Cl.
    *G05F 1/40*    (2006.01)
(52) U.S. Cl. ...................... 323/288; 323/208; 323/280; 307/110
(58) Field of Classification Search .................. 363/59; 323/208, 209, 222, 284, 288, 280, 370; 327/536; 307/110
    See application file for complete search history.

(56) References Cited

U.S. PATENT DOCUMENTS

| | | | |
|---|---|---|---|
| 6,806,762 B2* | 10/2004 | Stair et al. | 323/313 |
| 7,205,827 B2* | 4/2007 | Leung et al. | 323/280 |
| 2003/0006809 A1* | 1/2003 | Enriquez | 327/100 |

* cited by examiner

*Primary Examiner*—Jessica Han
(74) *Attorney, Agent, or Firm*—Jianq Chyun IP Office

(57) ABSTRACT

A capacitor multiplier including a capacitor, a first voltage follower, a first impedance element, and a second impedance element is provided. The input terminal of the first voltage follower is electrically connected to the first terminal of the capacitor. Wherein, the voltage level of the output terminal of the first voltage follower changes along with the voltage level of the input terminal thereof. The first terminal of the first impedance element is electrically connected to the first terminal of the second impedance element. The second terminal of the first impedance element is electrically connected to the first terminal of the capacitor. The second terminal of the second impedance element is electrically connected to the output terminal of the first voltage follower.

14 Claims, 4 Drawing Sheets

CAPACITOR MULTIPLIER

CROSS-REFERENCE TO RELATED APPLICATION

This application claims the priority benefit of Taiwan application serial no. 95102041, filed on Jan. 19, 2006. All disclosure of the Taiwan application is incorporated herein by reference.

BACKGROUND OF THE INVENTION

1. Field of Invention

The present invention relates to a capacitor device. More particularly, the present invention relates to a capacitor multiplier which is suitable for providing large capacitance in an integrated circuit.

2. Description of Related Art

In general circuit designs, capacitor devices of large capacitances are usually required in the circuits. For example, error amplifier and capacitor are usually used in a general circuit for frequency compensation to improve the performance of the circuit. For example, as shown in FIG. 1, the voltage converter 100 includes an integrated circuit (IC) 110, an inductor L11, a load capacitor C11, feedback resistors Rf1, Rf2, a compensating resistor Rz1, and a compensating capacitor Cz1. Since the voltage converter 100 is a typical buck DC-DC voltage converter, the operation detail will not be described here again. Generally speaking, to compensate the low-frequency pole of the voltage converter 100, the capacitance of the compensating capacitor Cz1 has to be very large. Thus, the compensating capacitor Cz1 has to be disposed outside the IC 110.

FIG. 2 is a circuit diagram of a voltage converter which uses another compensating technology. Referring to FIG. 2, the voltage converter 200 includes an IC 210, an inductor L21, a load capacitor C21, a feedback resistor Rf, a compensating resistor Rz2, and compensating capacitors Cz2, Cz3. Here, the voltage converter 200 is a typical buck DC-DC voltage converter, and the operation detail thereof will not be described again. Generally speaking, the capacitance of the compensating capacitor Cz3 is much smaller than the capacitance of the compensating capacitor Cz2. To compensate the frequency appropriately, the capacitance of the capacitor Cz2 has to be very large. Thus, the compensating capacitor Cz2 has to be disposed outside the IC 210.

However, the added compensating capacitors occupy very large circuit area since large capacitances are required. Thus, capacitors used for compensation are generally disposed outside the ICs. Such design will certainly put limit to the present trend of downsizing products. Therefore, product volume and cost can be reduced effectively if the capacitors having large capacitance can be disposed inside the ICs.

SUMMARY OF THE INVENTION

Accordingly, the present invention is directed to provide a capacitor multiplier for replacing the original large capacitor in a circuit with a smaller capacitor so as to reduce the circuit area effectively.

Based on the aforementioned objectives, the present invention provides a capacitor multiplier, which includes a capacitor, a first voltage follower, a first impedance element, and a second impedance element. The input terminal of the first voltage follower is electrically connected to the first terminal of the capacitor, wherein the voltage level of the output terminal of the first voltage follower changes along with the voltage level of the input terminal thereof. The first terminal of the first impedance element is electrically connected to the first terminal of the second impedance element. The second terminal of the first impedance element is electrically connected to the first terminal of the capacitor. The second terminal of the second impedance element is electrically connected to the output terminal of the first voltage follower.

According to an exemplary embodiment of the present invention, the capacitor multiplier further includes a second voltage follower, a third impedance element, and a fourth impedance element. The input terminal of the second voltage follower is electrically connected to the second terminal of the capacitor, wherein the voltage level of the output terminal of the second voltage follower changes along with the voltage level of the input terminal thereof. The first terminal of the third impedance element is electrically connected to the first terminal of the fourth impedance element. The second terminal of the third impedance element is electrically connected to the second terminal of the capacitor. The second terminal of the fourth impedance element is electrically connected to the output terminal of the second voltage follower.

In the present invention, the original large capacitor is replaced with a smaller capacitor by using a capacitor multiplier, so that the circuit area is reduced effectively. Thus, according to the present invention, a capacitor device of large capacitance can be disposed inside an IC, and accordingly, product volume and cost can be both reduced effectively.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 3:
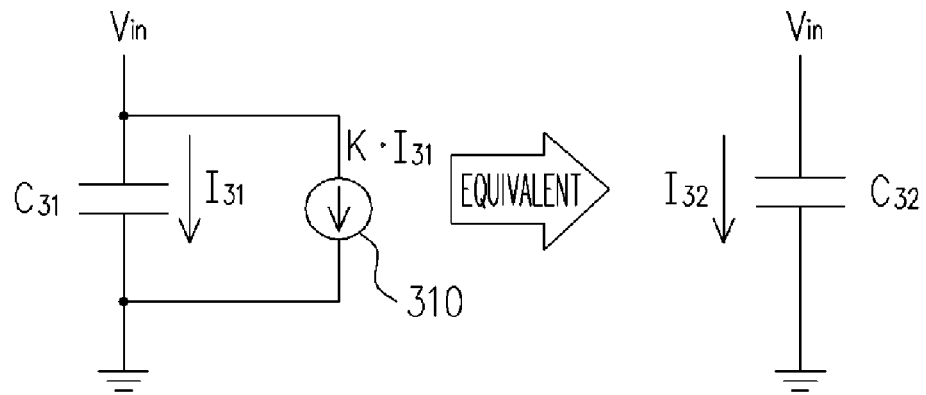
FIG. 3 illustrates a capacitor multiplier and an equivalent circuit thereof according to an embodiment of the present invention.

FIG. 3 illustrates a capacitor multiplier and an equivalent circuit thereof according to an embodiment of the present invention. Referring to FIG. 3, wherein $I_{31}$ is the current passing through the capacitor $C_{31}$. If the current $I_{31}$ passing through the capacitor $C_{31}$ can be detected at the instant of charge/discharge, and a dependent current source 310 having current $K \cdot I_{31}$ is constructed based on the current $I_{31}$ and is connected in parallel with the capacitor $C_{31}$, then the capacitance looking from the input voltage terminal Vin is equivalent to $C_{32}=(1+K) \cdot C_{31}$. Accordingly, the capacitance $C_{31}$ of the actual capacitor can be reduced to the desired value by adjusting the multiple factor K appropriately, and further, the equivalent capacitor $C_{32}$ (actually the capacitor $C_{31}$ and the current source 310) can be integrated into the IC to reduce the circuit area.

Figure 1:
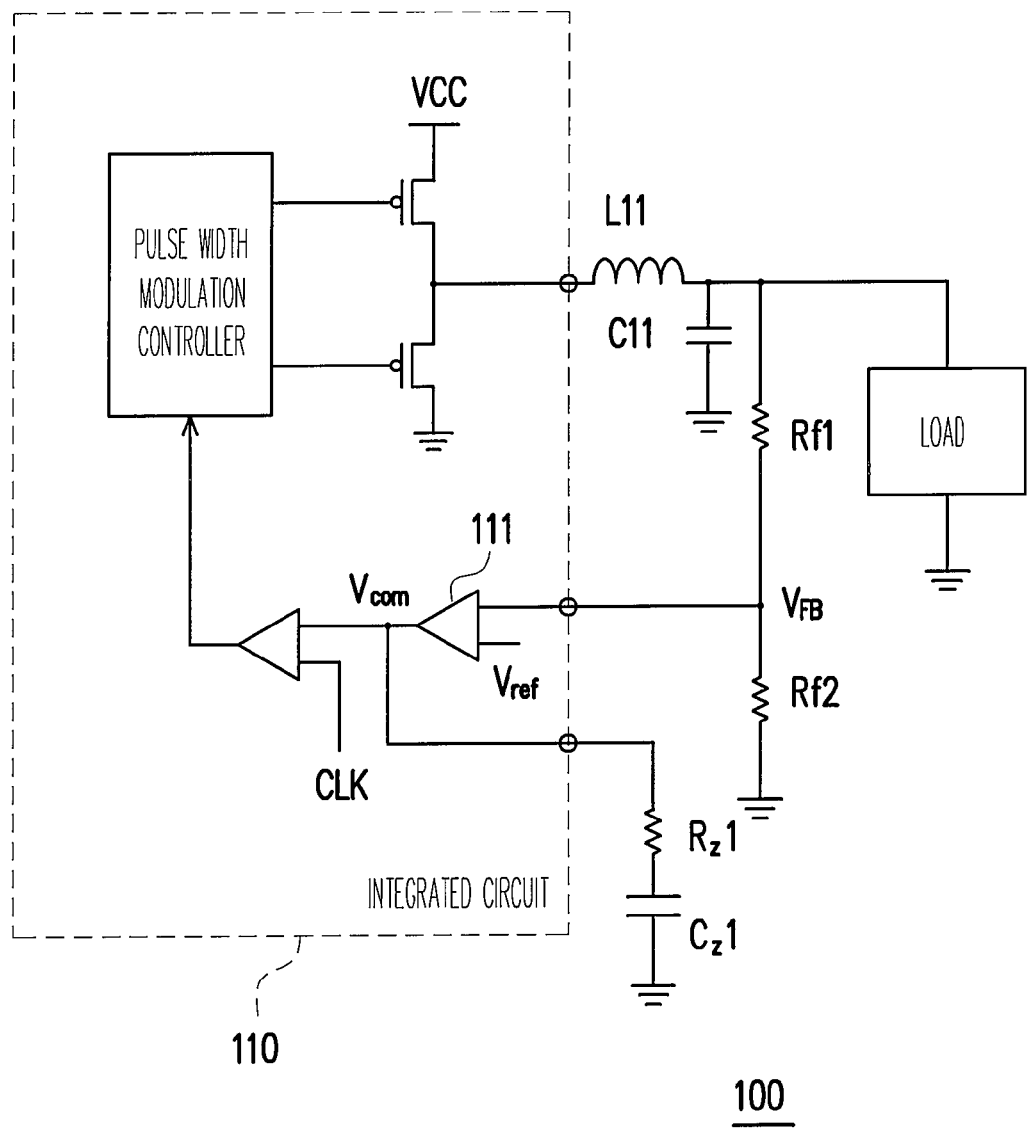
FIG. 1 is a circuit diagram of a conventional buck DC-DC voltage converter.
Figure 4:
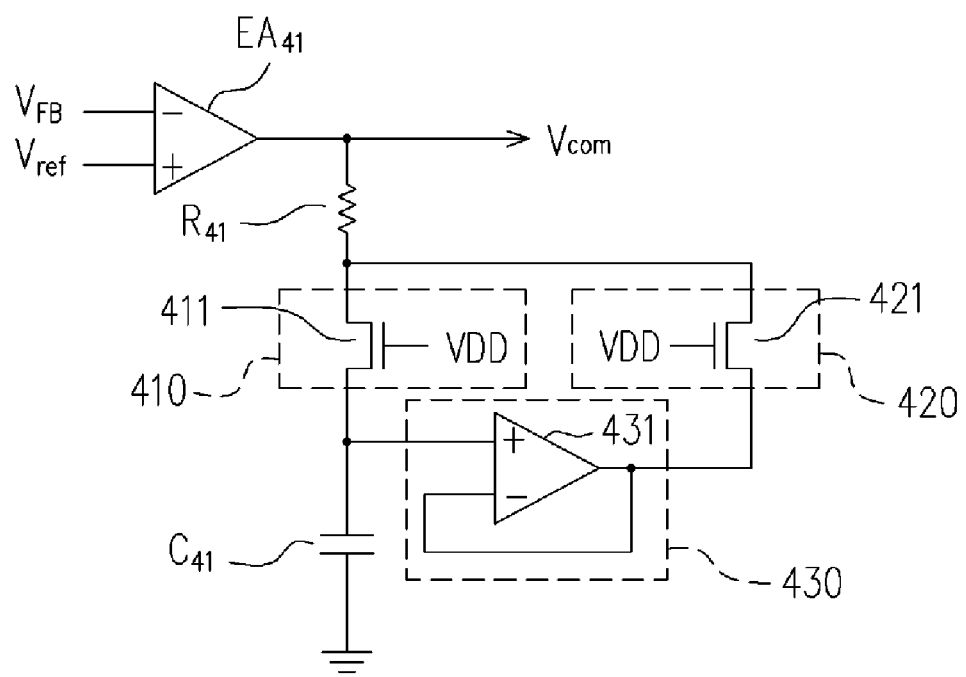
FIG. 4 illustrates a capacitor multiplier and the compensating circuit used by the capacitor multiplier according to an embodiment of the present invention.

FIG. 4 illustrates a capacitor multiplier and the compensating circuit used by the capacitor multiplier according to an embodiment of the present invention. The capacitor multiplier includes a capacitor $C_{41}$, a first voltage follower 430, a first impedance element 410, and a second impedance element 420. In the present embodiment, the capacitor multiplier is applied to a typical buck DC-DC voltage converter for compensating the error amplifier $EA_{41}$ (corresponding to the error amplifier 111 in FIG. 1) in the DC voltage converter. Referring to FIG. 4, the first terminal of the first impedance element 410 and the first terminal of the second impedance element 420 are connected with each other, and connected to the output terminal of the error amplifier $EA_{41}$ through the compensating resistor $R_{41}$ (corresponding to the compensating resistor Rz1 in FIG. 1).

In the present embodiment, the first impedance element 410 and the second impedance element 420 are implemented with two N-type transistors 411 and 421. The first impedance element 410 includes a first transistor 411. The source and the drain of the transistor 411 are used as the first terminal and the second terminal of the first impedance element 410 respectively, and the gate of the transistor 411 is electrically connected to a first voltage (here it is the system voltage VDD). The second impedance element 420 includes a second transistor 421. The source and the drain of the transistor 421 are used as the first terminal and the second terminal of the second impedance element 420 respectively, and the gate of the transistor 421 is also electrically connected to the system voltage VDD. The N-type transistors 411 and 421 both work in triode region, thus, the two transistors can be treated as two equivalent resistors. Accordingly, to those skilled in the art, the first impedance element 410 and the second impedance element 420 can also be implemented with other methods according to the idea of the present invention, for example, the first impedance element 410 and the second impedance element 420 can be implemented with P-type transistors, and the gates of the P-type transistors can be connected to the ground voltage.

The input terminal of the first voltage follower 430 is electrically connected to the second terminal of the first impedance element 410 and the first terminal of the capacitor $C_{41}$, and the output terminal of the first voltage follower 430 is electrically connected to the second terminal of the second impedance element 420. Due to the affection of the first voltage follower 430, the voltage level of the second terminal of the second impedance element 420 changes along with the voltage level of the second terminal of the first impedance element 410. In the present embodiment, the first voltage follower 430 includes a first operational amplifier 431. The first input terminal (here it is the positive input terminal) and the output terminal of the first operational amplifier 431 are used as the input terminal and the output terminal of the first voltage follower 430 respectively, and the second input terminal (here it is the negative input terminal) of the first operational amplifier 431 is electrically connected to the output terminal of the first operational amplifier 431.

In the present embodiment, the first terminal of the capacitor $C_{41}$ is electrically connected to the second terminal of the first impedance element 410, and the second terminal of the capacitor $C_{41}$ is electrically connected to a second voltage (for example, the ground voltage). Thus, if the channel length/width ratio of the transistors 411 and 421 is adjusted appropriately, the ratio between the corresponding equivalent resistances will be the same. The foregoing dependent current source can be constructed by two equivalent resistors for dividing the current according to the ratio between the two equivalent resistors. That is, if the currents passing through the first impedance element 410 and the second impedance element 420 are in the ratio of 1:K and the capacitance of the capacitor $C_{41}$ is Cc, then the equivalent capacitance of the capacitor multiplier is $(K+1) \cdot Cc$. Since the original large capacitor (for example, the compensating capacitor Cz1 in FIG. 1) is replaced with a smaller capacitor $C_{41}$ by using a capacitor multiplier, the circuit area is reduced effectively. Accordingly, in the present invention, the capacitor device of large capacitance can be disposed inside the IC, and further the product volume and cost can be both reduced effectively.

Figure 5:
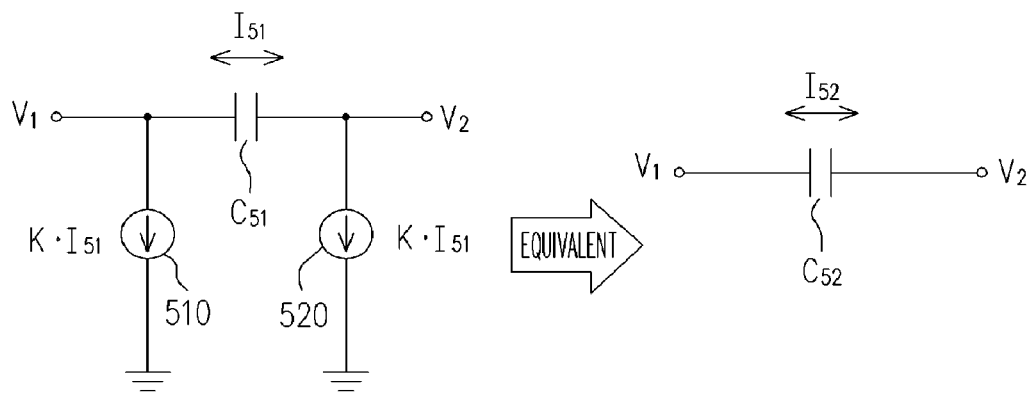
FIG. 5 illustrates a capacitor multiplier and an equivalent circuit thereof according to another embodiment of the present invention.

To describe various implementations of the present invention more clearly, another embodiment of capacitor multiplier according to the idea of the present invention will be disclosed below. FIG. 5 illustrates a capacitor multiplier and an equivalent circuit thereof according to another embodiment of the present invention. Referring to FIG. 5, wherein $I_{51}$ is the current passing through the capacitor $C_{51}$. If the current $I_{51}$ passing through the capacitor $C_{51}$ can be detected at the instant of charge/discharge, and the dependent current sources 510 and 520 having current $K \cdot I_{51}$ are constructed based on the current $I_{51}$ and are connected to the two terminals of the capacitor $C_{51}$ respectively, then the capacitance looking into the input voltage terminal $V_1$ (or the input voltage terminal $V_2$) is equivalent to $C_{52}=(1+K) \cdot C_{51}$. Accordingly, the large capacitance of the equivalent capacitor $C_{52}$ can be reduced to the desired small value of the capacitor $C_{51}$ by adjusting the multiple factor K appropriately, and further, the equivalent capacitor $C_{52}$ (actually the capacitor $C_{51}$ and the current sources 510 and 520) can be integrated into the IC to reduce the circuit area.

Figure 2:
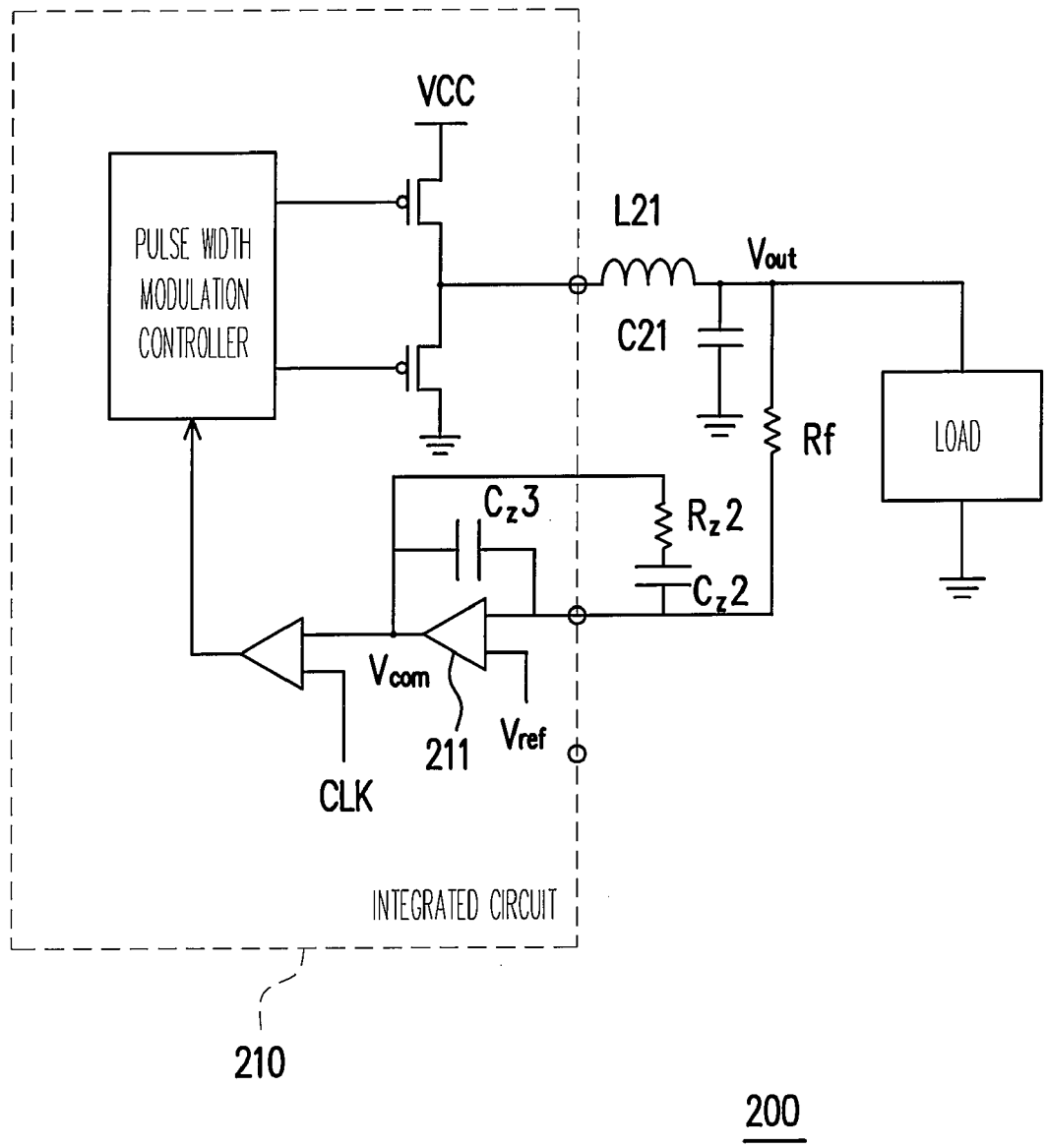
FIG. 2 is a circuit diagram of another conventional buck DC-DC voltage converter.
Figure 6:
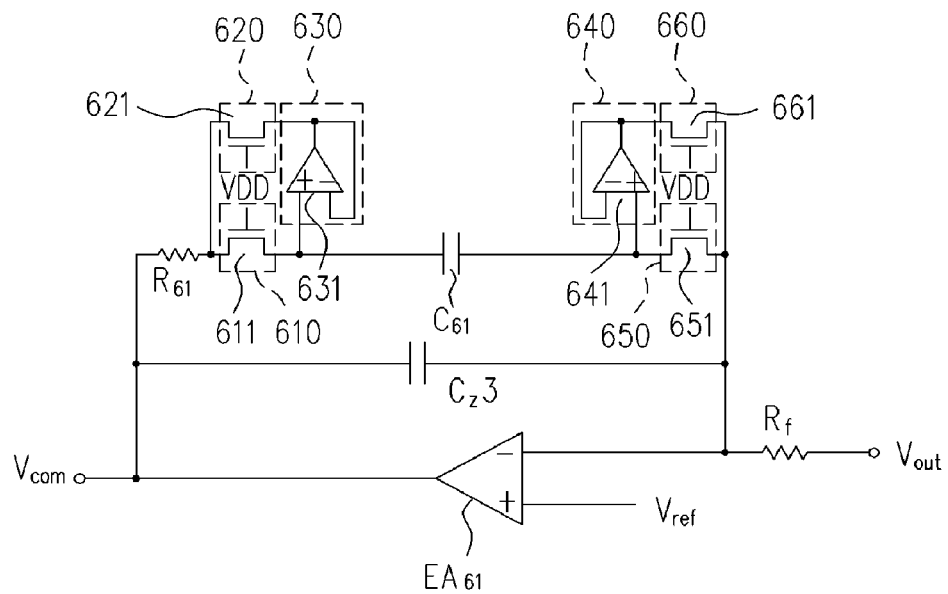
FIG. 6 illustrates a capacitor multiplier and the compensating circuit used by the capacitor multiplier according to another embodiment of the present invention.

FIG. 6 illustrates a capacitor multiplier and the compensating circuit used by the capacitor multiplier according to another embodiment of the present invention. The capacitor multiplier includes a capacitor $C_{61}$, a first voltage follower 630, a second voltage follower 640, a first impedance element 610, a second impedance element 620, a third impedance element 650, and a fourth impedance element 660. In the present embodiment, the capacitor multiplier is applied to a typical buck DC-DC voltage converter for compensating the error amplifier $EA_{61}$ (corresponding to the error amplifier 211 in FIG. 2) in the DC voltage converter. Referring to FIG. 6, the first terminal of the first impedance element 610 and the first terminal of the second impedance element 620 are connected with each other, and connected to the output terminal of the error amplifier $EA_{61}$ through the compensating resistor $R_{61}$ (corresponding to the compensating resistor Rz2 in FIG. 2). The first terminal of the third impedance element 650 and the first terminal of the fourth impedance element 660 are connected with each other, and connected to the input terminal of the error amplifier $EA_{61}$.

In the present embodiment, the impedance elements 610, 620, 650, and 660 are implemented with N-type transistors 611, 621, 651, and 661 respectively. The first impedance element 610 includes a first transistor 611. The source and the drain of the transistor 611 are used as the first terminal and the second terminal of the first impedance element 610 respectively, and the gate of the transistor 611 is electrically connected to a first voltage (here it is the system voltage VDD). The second impedance element 620 includes a second transistor 621. The source and the drain of the transistor 621 are used as the first terminal and the second terminal of the second impedance element 620 respectively, and the gate of the transistor 621 is also electrically connected to the system voltage VDD. The third impedance element 650 includes a third transistor 651. The source and the drain of the transistor 651 are used as the first terminal and the second terminal of the third impedance element 650 respectively, and the gate of the transistor 651 is electrically connected to the system voltage VDD. The fourth impedance element 660 includes a fourth transistor 661. The source and the drain of the transistor 661 are used as the first terminal and the second terminal of the fourth impedance element 660 respectively, and the gate of the transistor 661 is also electrically connected to the system voltage VDD. The N-type transistors 611, 621, 651, and 661 all work in a triode region, so that the four transistors can be treated as equivalent resistors. To those skilled in the art, the impedance elements 610, 620, 650, and 660 can be implemented according to the idea of the present invention with other methods, for example, the impedance elements 610, 620, 650, and 660 can be implemented with P-type transistors, and the gates of the P-type transistors can be connected to the ground voltage.

The input terminal of the first voltage follower 630 is electrically connected to the second terminal of the first impedance element 610 and the first terminal of the capacitor $C_{61}$, and the output terminal of the first voltage follower 630 is electrically connected to the second terminal of the second impedance element 620. Due to the affection of the first voltage follower 630, the voltage level of the second terminal of the second impedance element 620 changes along with the voltage level of the second terminal of the first impedance element 610. In the present embodiment, the first voltage follower 630 includes a first operational amplifier 631. The first input terminal (here it is the positive input terminal) and the output terminal of the first operational amplifier 631 are used as the input terminal and the output terminal of the first voltage follower 630 respectively, and the second input terminal (here it is the negative input terminal) of the first operational amplifier 631 is electrically connected to the output terminal of the first operational amplifier 631.

The input terminal of the second voltage follower 640 is electrically connected to the second terminal of the third impedance element 650 and the second terminal of the capacitor $C_{61}$, and the output terminal of the second voltage follower 640 is electrically connected to the second terminal of the fourth impedance element 660. Due to the second voltage follower 640, the voltage level of the second terminal of the fourth impedance element 660 changes along with the voltage level of the second terminal of the third impedance element 650. Here, the second voltage follower 640 includes a second operational amplifier 641. The first input terminal (here it is the positive input terminal) and the output terminal of the second operational amplifier 641 are used as the input terminal and the output terminal of the second voltage follower 640 respectively, and the second input terminal (here it is the negative input terminal) of the second operational amplifier 641 is electrically connected to the output terminal of the second operational amplifier 641.

In the present embodiment, the first terminal of the capacitor $C_{61}$ is electrically connected to the second terminal of the first impedance element 610, and the second terminal of the capacitor $C_{61}$ is electrically connected to the second terminal of the third impedance element 650. Thus, if the channel length/width ratio of the transistors 611 and 621 is adjusted appropriately, the ratio between the corresponding equivalent resistances will be the same. The foregoing dependent current source can be constructed by two equivalent resistors for dividing the current according to the ratio between the two equivalent resistors. That is, if the currents passing through the first impedance element 610 and the second impedance element 620 are in the ratio of 1:K and the capacitance of the capacitor $C_{61}$ is Cc, then the equivalent capacitance of the capacitor multiplier is (K+1)·Cc. Since the original large capacitor (for example, the compensating capacitor Cz2 in FIG. 2) is replaced with a smaller capacitor $C_{61}$ by using a capacitor multiplier, the circuit area is reduced effectively. Accordingly, in the present invention, the capacitor device of large capacitance can be disposed inside the IC, and further the product volume and cost can be both reduced effectively.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A capacitor multiplier, comprising:
   a capacitor;
   a first voltage follower, the input terminal of the first voltage follower being electrically connected to the first terminal of the capacitor, wherein the voltage level of the output terminal of the first voltage follower changes along with the voltage level of the input terminal of the first voltage follower;
   a first impedance element, the second terminal of the first impedance element being electrically connected to the first terminal of the capacitor; and
   a second impedance element, the first terminal of the second impedance element being electrically connected to the first terminal of the first impedance element, the second terminal of the second impedance element being electrically connected to the output terminal of the first voltage follower.

2. The capacitor multiplier as claimed in claim 1, wherein if the current passing through the first impedance element is in the ratio of 1:K to the current passing through the second impedance element and the capacitance of the capacitor is Cc, the equivalent capacitance of the capacitor multiplier is (K+1)·Cc.

3. The capacitor multiplier as claimed in claim 1, wherein the first voltage follower comprises:
   a first operational amplifier, the first input terminal and the output terminal of the operational amplifier being used as the input terminal and the output terminal of the first voltage follower respectively, the second input terminal of the first operational amplifier being electrically connected to the output terminal of the first operational amplifier.

4. The capacitor multiplier as claimed in claim 1, wherein the first impedance element comprises:
   a first transistor, the first source/drain and the second source/drain of the first transistor being used as the first terminal and the second terminal of the first impedance element respectively, the gate of the first transistor being electrically connected to a first voltage; and
   the second impedance element comprises:
   a second transistor, the first source/drain and the second source/drain of the second transistor being used as the first terminal and the second terminal of the second impedance element respectively, the gate of the second transistor being electrically connected to the first voltage.

5. The capacitor multiplier as claimed in claim 4, wherein the first and the second transistors are both N-type transistors, and the first voltage is system voltage.

6. The capacitor multiplier as claimed in claim 4, wherein the first and the second transistors are both P-type transistors, and the first voltage is ground voltage.

7. The capacitor multiplier as claimed in claim 1, wherein the second terminal of the capacitor is electrically connected to a second voltage.

8. The capacitor multiplier as claimed in claim 7, wherein the second voltage is ground voltage.

9. The capacitor multiplier as claimed in claim 1 further comprising:
   a second voltage follower, the input terminal of the second voltage follower being electrically connected to the second terminal of the capacitor, wherein the voltage level of the output terminal of the second voltage follower changes along with the voltage level of the input terminal of the second voltage follower;
   a third impedance element, the second terminal of the third impedance element being electrically connected to the second terminal of the capacitor; and
   a fourth impedance element, the first terminal of the fourth impedance element being electrically connected to the first terminal of the third impedance element, the second terminal of the fourth impedance element being electrically connected to the output terminal of the second voltage follower.

10. The capacitor multiplier as claimed in claim 9, wherein the second voltage follower comprises:
    a second operational amplifier, the first input terminal and the output terminal of the second operational amplifier being used as the input terminal and the output terminal of the second voltage follower respectively, the second input terminal of the second operational amplifier being electrically connected to the output terminal of the second operational amplifier.

11. The capacitor multiplier as claimed in claim 9, wherein the third impedance element comprises:
    a third transistor, the first source/drain and the second source/drain of the third transistor being used as the first terminal and the second terminal of the third impedance element respectively, the gate of the third transistor being electrically connected to a first voltage; and
    the fourth impedance element comprises:
    a fourth transistor, the first source/drain and the second source/drain of the fourth transistor being used as the first terminal and the second terminal of the fourth impedance element respectively, the gate of the fourth transistor being electrically connected to the first voltage.

12. The capacitor multiplier as claimed in claim 11, wherein the third and the fourth transistors are both N-type transistors, and the first voltage is system voltage.

13. The capacitor multiplier as claimed in claim 11, wherein the third and the fourth transistors are both P-type transistors, and the first voltage is ground voltage.

14. The capacitor multiplier as claimed in claim 1, wherein the capacitor multiplier is built in an integrated circuit.

* * * * *